Figure 7:
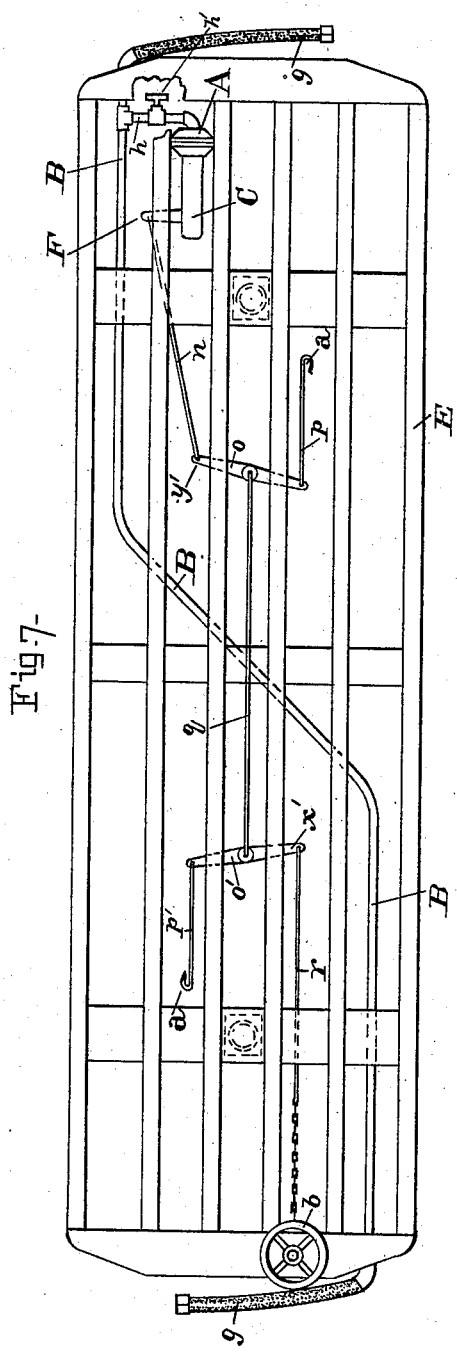

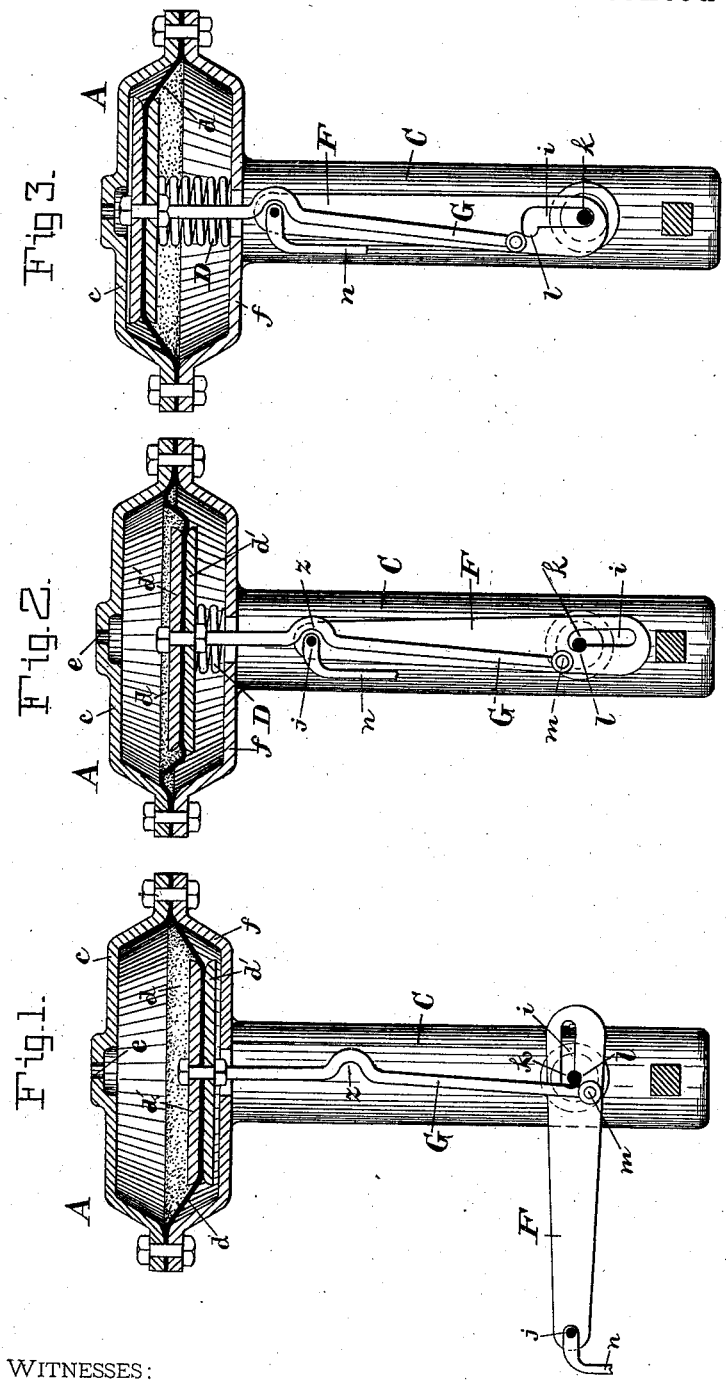

(No Model.) 4 Sheets—Sheet 2.
G. A. BOYDEN.
CAR BRAKE.
No. 372,890. Patented Nov. 8, 1887.
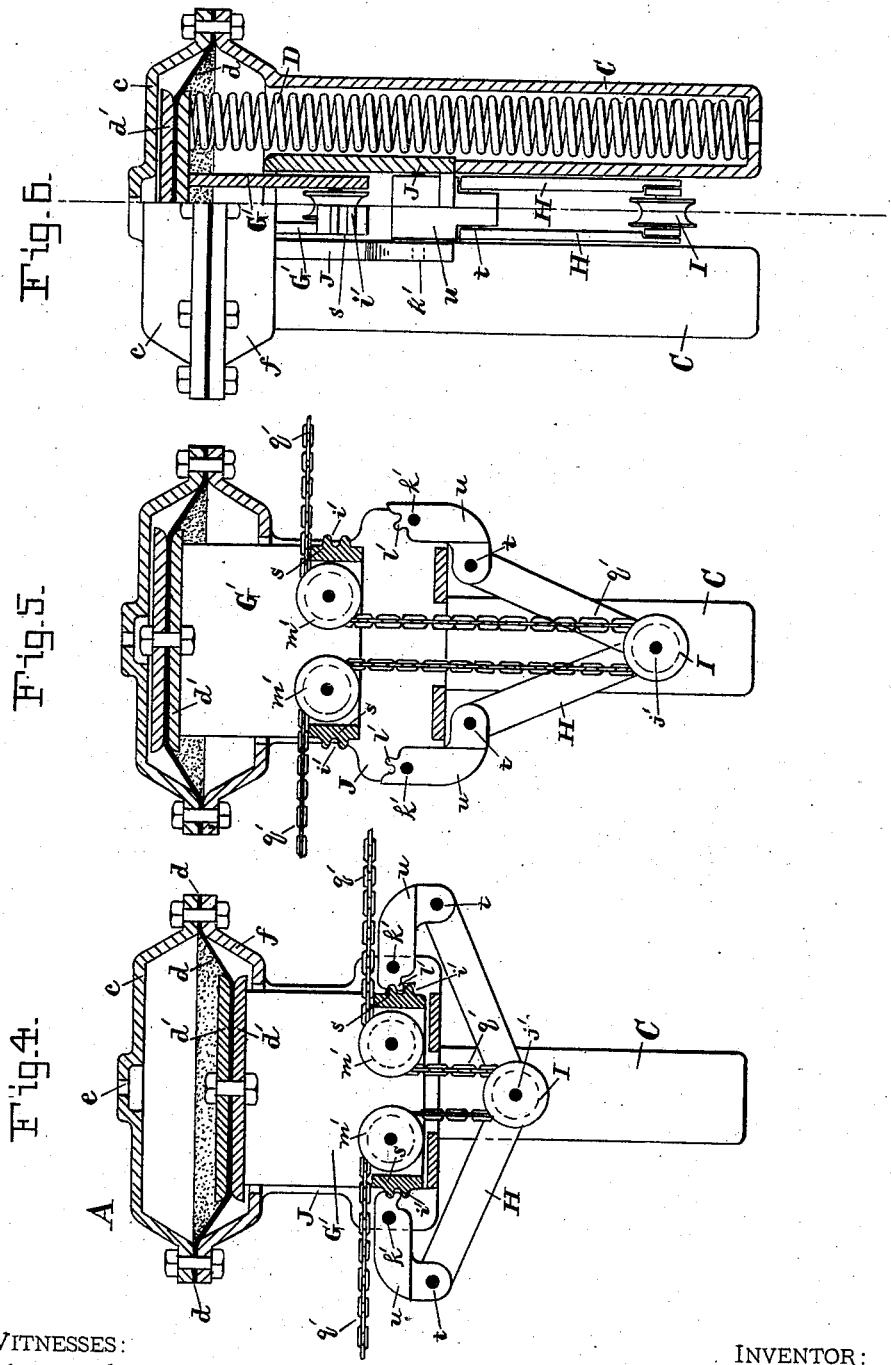
WITNESSES:
John E. Morris
R. L. Clemmitt
INVENTOR:
Geo. A. Boyden
BY Chas B. Mann
ATTORNEY.

(No Model.) 4 Sheets—Sheet 3.

G. A. BOYDEN.
CAR BRAKE.

No. 372,890. Patented Nov. 8, 1887.

WITNESSES:
John E. Morris.
R. L. Clemmitt.

INVENTOR:
Geo. A. Boyden

BY Chas B. Mann
ATTORNEY.

N. PETERS. Photo-Lithographer, Washington, D. C.

(No Model.) 4 Sheets—Sheet 4.
G. A. BOYDEN.
CAR BRAKE.
No. 372,890. Patented Nov. 8, 1887.
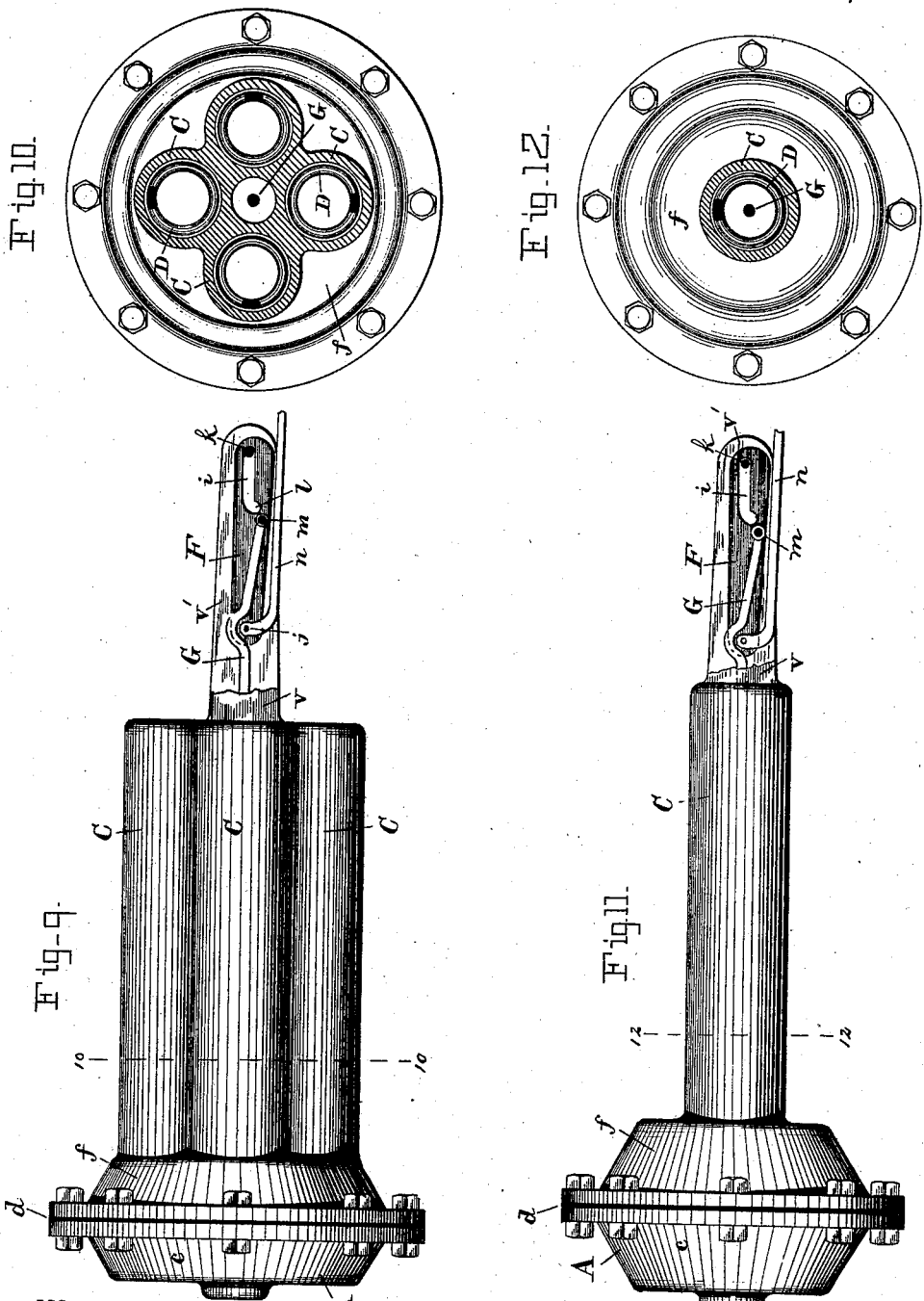
WITNESSES:
John E. Morris
R. L. Clemmitt
INVENTOR:
Geo. A. Boyden
BY Chas. B. Mann
ATTORNEY.

UNITED STATES PATENT OFFICE.

GEORGE A. BOYDEN, OF BALTIMORE, MARYLAND, ASSIGNOR TO THE BOYDEN POWER BRAKE COMPANY OF BALTIMORE CITY, OF MARYLAND.

CAR-BRAKE.

SPECIFICATION forming part of Letters Patent No. 372,890, dated November 8, 1887.

Application filed August 26, 1887. Serial No. 247,916. (No model.)

*To all whom it may concern:*

Be it known that I, GEORGE A. BOYDEN, a citizen of the United States, residing at Baltimore, in the State of Maryland, have invented certain new and useful Improvements in Car-Brakes, of which the following is a specification.

My invention relates to brakes for railroad-cars wherein the brakes are applied by the pressure of springs and released, controlled, and held off by the pressure of compressed fluid supplied through a continuous train-pipe leading from the locomotive.

It is essential to a practical car-brake that the brake-shoes when not against the wheels for braking shall be so far removed from the wheels as to entirely avoid contact therewith. To provide for this movement of the brake-shoes, and also to allow for the leverage in the "foundation gear" of the brake mechanism now generally used on cars, requires that the prime mechanical power (which in the well-known air-brake is a cylinder-piston and in the brake herein described is a spring) shall have a movement or stroke of about seven to ten inches and a pressure of about four thousand pounds. To obtain this movement and pressure direct from one or more springs would require them to have dimensions so large as to be unwieldy and impracticable for a car-brake. The first object, therefore, of my invention is to provide means in combination with a spring whereby the pressure resulting from the first portion of the spring's movement will be indirectly applied and said movement so increased by the coaction of other mechanism as to take up all the slack in the foundation gear and place the shoes in contact with the car-wheels, and then the pressure resulting from the latter portion of the spring's movement will be directly applied with its full power to force said shoes hard against the wheels.

Where a spring is the prime mechanical power for applying and compressed fluid the medium for releasing the car-brakes, it is a desideratum that when the brakes are not in use with the compressed fluid the spring shall be kept in a state of as great relaxation as possible, in order thereby to preserve its elasticity and power. The second object, therefore, of my invention is to provide such a connection of the foundation gear with the ordinary hand-wheel and the spring that whenever the brakes are operated alone with the ordinary hand-wheel the said spring will be in the condition of its greatest relaxation.

In operating the brakes of the several cars of a train by a power which acts uniformly or with equal pressure on all the cars—such as compressed air and liquid or vacuum emanating from the locomotive or a spring on each car, a difficulty in doing the most effective braking without sliding the car-wheels arises from the fact that some of the cars in the same train may be loaded heavily, some lightly, and some may be without load. It is important, therefore, in order to do the most effective braking to be able to apply the shoes to the wheels of each car with as great pressure as the load on the car will permit; but the pressure should always be somewhat less than the weight that is on the axles. The third object, therefore, of my invention is to provide means whereby the pressure to be exerted by the spring on the foundation gear of each car of a train may be conveniently changed and regulated by the ordinary hand-wheel, so as to be greater or less and to correspond with the load each car may be carrying.

The invention is illustrated in the accompanying drawings, (four sheets,) in which—

Figure 8:
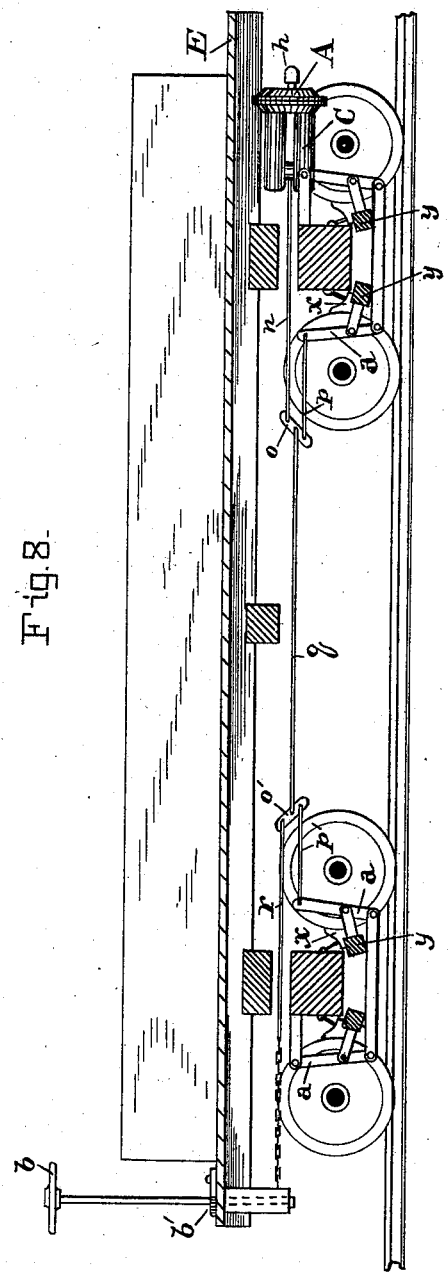

Figure 1 is a view, partly in section, of the prime power or combined spring device, showing the position when the brakes are off. Fig. 2 is a view of the same, showing the position of the parts after the first portion of the spring's movement. Fig. 3 is a view of the same, showing the position of the parts when the brakes are on, that is, after the latter portion of the spring's movement. Fig. 4 is a sectional view showing a modification in the construction of the prime power or combined spring device, showing the position when the brakes are off. Fig. 5 is a view of the same, showing the position of the parts when the brakes are on—that is, after the latter portion of the spring's movement. Fig. 6 is a transverse side view, partly in section, of the modification seen in Fig. 5, and showing the two spring-pockets. Fig. 7 is a top plan view of a car-frame, showing that part of the foundation gear which connects the prime mechanical power or spring, as illustrated in Fig. 1, and the ordinary hand-wheel. Fig. 8 is a longitudinal section of a car, showing the foundation gear, with the ordinary hand-wheel and prime mechanical power or combined spring device. Figs. 9 and 10 show side and cross-section views of the combined spring device, illustrating a modification in the position of the slack-lever, and showing four springs and pockets. Figs. 11 and 12 show side and cross-section views of the combined spring device, illustrating the same modification in the position of the slack-lever, and showing one spring and pocket.

The car is designed to be equipped with any ordinary or well-known foundation-gear brake mechanism, which includes shoes $x$, brake-beams $y$, and levers $a$ on the trucks, and the rod or chains and levers which connect these parts with the prime-power spring and ordinary hand-wheel, and said foundation gear is arranged to be operated as usual, whenever it may be desired, by the well-known hand-wheel $b$ on an upright shaft.

The first part of my invention relates to the combined spring device which constitutes the prime mechanical power for applying the brakes.

The letter A designates an expansible chamber for compressed fluid. This chamber in the present instance is a metal box or drum having a rigid side, $c$, and a movable side, $d$. The form of movable side here shown is that commonly called a "flexible diaphragm," which is secured to the metal box part in any suitable manner. Other known forms of expansible chamber—such as a cylinder and piston—may be used. The flexible diaphragm $d$ is re-enforced on both sides by plates $d'$.

An opening, $e$, in the rigid side of the chamber or box provides for a connection with the train-pipe B, and a frame or open cover, $f$, is secured to the said metal box $c$ over the flexible diaphragm. One or more tubular-shaped pockets, C, are rigidly secured, each by one end, to the said frame or cover $f$, and project therefrom, and, longitudinally considered, these pockets have position at a right angle with respect to the said movable side. A spiral spring, D, occupies each pocket, and one end of each spring is in contact with one of the diaphragm-plates $d'$, and normally presses the flexible diaphragm $d$ toward the rigid side $c$ of the chamber. It will be seen that when fluid under pressure enters the expansible chamber A at the train-pipe connection $e$ the flexible diaphragm is expanded, as shown in Fig. 1, and the springs D will be contracted and put in the condition of greatest tension and the brakes held off. When the reverse action of the flexible diaphragm takes place—that is, when fluid-pressure is exhausted from the chamber A—the springs will expand, causing the flexible diaphragm to collapse or take position against the rigid side $c$ of the chamber, and then the springs will be in the condition of greatest relaxation, and thereby, in the normal operation of the device, the brakes will be applied.

The expansible chamber A may be located and secured on the car-frame E at any desired point. The train-pipe B is arranged in a well-known way, so that its terminals will be at diagonally-opposite corners of the car-ends, whereat the hose-couplings $g$ are attached. The branch pipe $h$ from the train-pipe B to the expansible chamber A has a cock, $h'$, whereby the said chamber and the spring on the car may be cut out from the action of the compressed fluid supplied through the train-pipe.

Reference will now be made to the mechanism connecting the foundation-gear and spring. A slack lever, F, (see Figs. 1, 2, 7, and 9,) has a slot, $i$, the greatest dimension of which is in the direction of the length of the lever, and the lever is pivoted through the said slot by a fixed pin, $k$. Where two spring-pockets are used, as in Figs. 1, 2, and 3, the pivot-pin may be secured between the two spring-pockets C. The slot has at one end a side notch or slight offset, $l$, which, while the lever is turning serves as a bearing to rest on the said pivot-pin $k$. The slack-lever F may therefore turn on the fixed pivot-pin $k$, and when it has turned from the position shown in Fig. 1 as far as it is permitted to the position shown in Fig. 2, it will disengage from the pivot $k$ and slide in the direction of its length toward the flexible diaphragm.

The slack-lever F, having the slot $i$ and the fixed pivot-pin $k$, comprises "disengaging mechanism" which in this combination is productive of important results, hereinafter explained. The diaphragm-rod G has one end connected with the movable side $d$ of the expansible chamber and the other end jointed at $m$ to the slack-lever F. When the movable side of the expansible chamber, through the diaphragm-rod G, draws on the slack-lever F, the latter will first turn through an arc of about ninety degrees from the crosswise position which it has in Fig. 1 to an endwise position, as in Fig. 2. This turning of the slack-lever is effected by the first portion of the spring's movement, and the end of the power-rod $n$ is placed in the offset $z$ of the diaphragm-rod G, and the jointing-pin $j$ slightly beyond the center line of the said diaphragm-rod, and thereby the slack-lever F will be retained in the latter position, and while so retained the power-rod $n$ and the diaphragm-rod G will in effect act as one rod, whereby the full pressure of the latter portion of the spring's movement will be applied directly to the foundation gear to force the brake-shoes hard against the wheels. A system of rods (or chains) and levers, (see Figs. 7 and 8,) which will be presently described, connects the slack-lever F with the levers of the foundation gear, which latter levers are located at $a$. It will now be seen that when fluid-pressure is exhausted from the expansible chamber the contracted springs D will begin to expand or move out, and an important result follows—to wit, the first portion of the spring's movement (in practice a movement of about an inch) will turn the slack-lever F on its pivot, and the greatly-increased movement of the free end of this lever will be sufficient to take up all the slack in the brake mechanism and place the brake-shoes in contact with car-wheels. Thus the first portion of the spring's movement is indirectly applied to take up the slack, and then when the slack-lever F has turned to an endwise position with respect to the said movable side d of the chamber it so disengages from the pivot-pin k that said pin ceases to act as a pivot, and the latter portion of the spring's movement—in practice a movement of about two or three inches—with its full pressure will be directly applied to force the brake-shoes hard against the wheels.

The system of rods (or chains) and levers before referred to consist of a power-rod, n, jointed by one end to the slack-lever F and by the other end to one end of a floating lever, o, and a rod, p, connecting the other end of the said floating lever o with the beam-lever a of the foundation gear on one truck. For the other truck is a similar floating lever, o', and rod p', and a rod or chain, r, connecting one end of the floating lever o' with the upright shaft of the hand-wheel b. A central rod, q, connects the said two floating levers o and o'. By this connection between the brake-spring D and the ordinary hand-wheel shaft the brakes may be operated by the combined action of the said spring and the compressed fluid or by the ordinary hand-wheel. Furthermore, I obtain the desideratum that whenever the brakes are operated alone with the ordinary hand-wheel the spring will be and will remain in the condition of its greatest relaxation, at which time the power of a brakeman, as ordinarily exerted at the hand-wheel b, will not be sufficient to affect this condition of the spring. When the brakes are applied by the spring, the end x' of that floating lever o' which is connected with the hand-wheel shaft becomes a fixed point, and when they are operated by the hand-wheel shaft the end y' of that floating lever o which is connected with the power-rod n becomes a fixed point. Whichever way the brake may be applied—by the spring D or by the hand-wheel b—the pressure exerted will be equal or alike on all the shoes x of the car.

In the combined spring device shown in Figs. 1, 2, and 3 two pockets C and two springs D are employed, and the disengaging slack-lever F is pivoted between the two pockets. My invention of this combination, however, is not limited to any particular number of pockets or springs, nor to a precise position of the slack-lever with respect thereto. In illustration of this, Figs. 9 and 10 show four spring-pockets and four springs, and the slack-lever F is pivoted between two arms, v v', attached at the end of the pockets, and which project therefrom. In Fig. 9, and also Fig. 11, one arm, v, is shown broken away in order to expose to view the slack-lever F. Figs. 11 and 12 show the device with only one pocket C and one spring D and the slack-lever F pivoted to arms v v' at the end of the pocket. In this case the diaphragm-rod G extends up through the spiral spring D.

The combined spring device, embracing the expansible chamber, the spring, and a disengaging slack take-up, is not limited to a particular form of "slack take-up," such as the lever F shown in Figs. 1, 2, and 3. In illustration of this Figs. 4, 5, and 6 show a modification whereby the same result is produced. The modification has a compound lever, H, of the form known as "lazy-tongs," and a pulley, I, is carried by the levers H. A plate or bracket, J, is fixed to each of the two spring-pockets C, and the two short arms u of the lazy-tongs lever H are each pivoted by a separate fixed pin, k', to said brackets, and the end of these two arms are provided with cog-teeth l'. The long arms are jointed to the short ones by a pin, t, and are jointed together by a pin, j', which also carries the pulley I. Two parallel plates, G', are attached to the diaphragm-plates d', and two cross-bars, s, each having rack-teeth i' on its outer side, connect the said two parallel plates. When the brakes are off, the parts have the position shown in Fig. 4. The cog-teeth l' of each short arm engages with the rack-teeth i' on one of the connecting-bars s. The two plates G' carry two pulleys, m', the position of which with respect to the pulley I, carried by the levers, is such as to form a V-shaped triangle. A chain, q', passes under the pulley I on the compound slack-lever or lazy-tongs H. Then one part of the chain passes over one of the said plate-pulleys m', and thence extends toward one truck of the car, while the other part of the chain passes over the other plate-pulley m', and extends toward the other truck. Each end of this chain is attached to separate floating levers o and o'. When the springs in the pockets C expand, the movable side d of the expansible chamber is pressed toward the rigid side c, and carries the plates G', toothed bars s, and pulleys m'. Thereby the two short arms u of the lazy-tongs which are pivoted by the fixed pin k' will, by the action of the geared teeth i' l', turn from the position which they have in Fig. 4, through an arc of about ninety degrees, to the position shown in Fig. 5, and thereby the long arms and pulley I will be moved, as shown, in a direction away from the expansible chamber A, and by drawing on the chain q' will take up the "slack" in the brake mechanism. This result is attained by the first portion of the spring's movement. When the two short arms u have turned on their pivots k' as far as they are permitted, the rack-teeth i' on the connecting-bars will disengage from the cog-teeth l', and the lazy-tongs slack-lever H will cease to move, and then the latter portion of the spring's movement, with full pressure acting on the movable side of the chamber d, parallel plates G', two pulleys m', and chain q', will be directly applied to force the brake-shoes hard against the wheels.

In operating this brake on a train of cars the train-pipe B should first be connected with the locomotive and thence throughout the train. The brakes of all the cars must then be applied by the hand-wheel b on each car—the pressure exerted on the different cars being made to correspond, as near as may be possible, with the load each car may be carrying—and the hand-wheel shaft secured from accidental releasing by a suitable pawl, b', after which the brakes are to be operated by the action of the spring and the compressed fluid, and controlled entirely by the engineer in the following manner: As just stated, the brakes before starting are first applied by the hand-wheel on each car. When it is desired to release the brakes, the engineer turns the usual brake-cock to permit compressed fluid to pass from the usual reservoir on the locomotive to the train-pipe B, which supplies all the expansible chambers A, and thereby compresses or contracts the springs D and releases the brakes. As long as the train-pipe is full of compressed air or other fluid, the brakes will be held off. When the engineer desires to apply the brakes, wholly or partially, he releases the compressed fluid or allows it to escape from the train-pipe in accordance with the brake-pressure which is to be applied to the car-wheels. It will be seen that the brake is fully under the control of the engineer, and in case of the train accidentally separating in two or more parts (which often occurs) the brakes on all the cars will be automatically applied by reason of the escape of the compressed fluid from the train-pipe. In case any of the hose-connections between the cars should burst, or from any cause the compressed fluid should escape, the brakes will be promptly applied by the action of the spring D and the train stopped. When the locomotive is disconnected from the train, the brakes on the cars will remain applied, and may be released by the hand-wheels b in the usual manner.

The spring as a prime mechanical power, to be used, as herein described, for applying car-brakes, has advantages over compressed fluid, one of which is that as a braking-power certain to act in an emergency the spring will invariably insure control of a train, whereas air or other compressed fluid is subject to leakage, to the chance of an insufficient air-pressure on the locomotive, and other incidents inherent to its use. Again, the spring and compressed fluid, as here used, enables the engineer to apply to the car-wheels any desired amount of brake-pressure less than the maximum and to maintain the same for any length of time, and, without releasing the said brake-pressure, to increase or lessen the same, as desired. Thus this spring-brake is better adapted for the requirements of the service. It is not essential that the springs employed be of the spiral form. It is also obvious that the parts herein shown and described may be varied or changed in their form and construction, as two plans to secure this end are illustrated. Any such modifications, therefore, are within the scope of my invention.

It obvious that the essential feature of the invention lies in an interposed movement-multiplying device arranged to operate during the first part of the movement of the spring, when less force is required to take up the slack, and then to allow the spring to act directly on the brake-lever.

The term "slack," as herein used, is meant to include all looseness of parts and play between the joints or connections of the different parts of the foundation gear, and also the space which intervenes between the brake-shoes and the car-wheels when the brakes are off.

The method of operation herein described is not claimed, it being the subject-matter of an application filed by me in the United States Patent Office September 5, 1887, Serial No. 248,806.

Having described my invention, I claim and desire to secure by Letters Patent of the United States—

1. A mechanism for actuating railway-car brakes, comprising the combination on each car of an expansible chamber for compressed fluid, a spring for applying the brakes, and a disengaging slack-take-up device, whereby the first portion of the spring's movement is applied to the slack-take-up device and the latter portion of the spring's movement is applied to force the brakes hard against the wheels.

2. In a car-brake, the combination of the foundation gear, an expansible chamber, a train-pipe having its terminals at opposite ends of the car and connected with said expansible chamber, a spring for applying the brakes, and a disengaging slack-take-up device connecting the movable side of the said chamber with the foundation gear.

3. A mechanism for actuating railway-car brakes, comprising the combination on each car of an expansible chamber, A, spring-pockets C, containing springs, a slack-take-up device attached to the said spring-pockets, and a connection uniting the said movable side of the chamber and slack-take-up device.

4. A mechanism for actuating railway-car brakes, comprising the combination of the box or drum c, a frame or cover, f, secured to the said box or drum, a flexible diaphragm, d, clamped between said box and frame, a spring, D, bearing on the diaphragm, and a disengaging slack-take-up device, for the purpose set forth.

5. A mechanism for actuating railway-car brakes, comprising the combination of the box or drum c, a frame or cover, f, secured to the said box or drum, a flexible diaphragm, d, clamped between said box and frame, a tubular pocket, C, secured to the said frame, a spring, D, occupying the pocket, and a disengaging slack-take-up device, for the purpose set forth.

6. A mechanism for actuating railway-car brakes, comprising the combination of an expansible chamber for compressed fluid, a spring, a fixed pivot-pin, k, a lever pivoted by said pivot-pin, and also adapted to slide thereon, and a connection, G, uniting the movable side of the expansible chamber with the said lever, whereby the first portion of the spring's movement is converted into a greater movement by the swing of the lever and the latter portion of the spring's movement is applied direct by the sliding of the lever.

7. In a car-brake, the combination of the foundation gear, an expansible chamber, a train-pipe having its terminals at opposite ends of the car, a branch pipe, h, connecting the train-pipe with the expansible chamber, and having a cut-off-cock, h', a spring for applying the brakes, and a disengaging slack-take-up device connecting the movable side of the said chamber with the foundation gear.

8. In a car-brake, the combination of the hand-wheel, a spring for applying the brakes, an expansible chamber for compressed fluid, a disengaging slack-take-up device, and foundation gear connecting with both the said hand-wheel and spring.

9. A car-brake-actuating mechanism, consisting of a spring, and expansible chamber for compressed fluid, arranged to compress the spring, connections between the spring and the brake-lever, and an interposed movement-multiplying device arranged to operate through the first part only of the movement of the spring, whereby the slack is first taken up and the power afterward directly applied, substantially as described.

In testimony whereof I affix my signature in the presence of two witnesses.

GEORGE A. BOYDEN.

Witnesses:
B. F. BOYDEN,
JOHN E. MORRIS.